United States Patent [19]

Padgett

[11] 3,774,175

[45] Nov. 20, 1973

[54] TRUNK TIMER ARRANGEMENT

[75] Inventor: Richard A. Padgett, Lombard, Ill.

[73] Assignee: GTE Automatic Electric Laboratories Incorporated, Northlake, Ill.

[22] Filed: Sept. 5, 1972

[21] Appl. No.: 286,525

[52] U.S. Cl. .......................... 340/173 R, 340/172.5
[51] Int. Cl. .............................................. G11c 7/00
[58] Field of Search ...................... 340/172.5, 173 R

[56] References Cited

UNITED STATES PATENTS 3,523,284 · 8/1970 Washizuka ...................... 340/173 R

*Primary Examiner*—Terrell W. Fears
*Attorney*—K. Mullerheim et al.

[57] ABSTRACT

A trunk timer for timing both answer timing and forced disconnect timing, wherein the counting rate during forced disconnect timing is at a different counting rate. Each trunk has its own individual trunk timer, in its assigned memory word.

7 Claims, 7 Drawing Figures

PATENTED NOV 20 1973 3,774,175

SHEET 2 OF 6

TRUNK TIMER ARRANGEMENT

FIELD OF THE INVENTION

This invention relates to a centralized automatic message accounting system. More particularly, it relates to an improved trunk timer arrangement applicable for use in such a system.

In systems such as the hereinafter disclosed centralized automatic message accounting system, normal telephone ticketing procedures dictate the requirement for a trunk timer. These trunk timers, among other things, allow or provide for a "grace period" or time interval during which the called party, when answering a call, can determine if he is the party being called. This "grace period" also accommodates "hookswitch fumble" or other cases where the called party inadvertently drops the handset, and permits him to reanswer without creating a double charge for the same call.

Such trunk timers also are required because the "switch train" is controlled by the calling party. If the calling party does not "hang up" after the conversation is over, the trunk cannot be released to handle a new call. In this case, the trunk timer provides an interval during which the calling party must "hang up." If the calling party does not release the trunk during this interval, the trunk is "forced released."

Accordingly, it is an object of the present invention to provide an improved centralized automatic message accounting system.

More particularly, it is an object to provide in such a system a "grace period" on answer for the called party.

Still another object is to provide in such a system a means for "force releasing" held trunks.

More particularly still, it is an object to provide an improved trunk timer arrangement, for providing both a "grace period" and a means for "force releasing" a held trunk in such systems.

Still another object is to provide a memory timer for a trunk timer.

Further still, it is an object to provide a single memory timer with different counting rates.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature an objects of the invention, reference should be had to the following detailed description taken in connection with the accompanying drawings in which:

FIG. 7 is a functional block diagram of a portion of the scanner controller in the trunk scanner of the billing unit.

Similar reference characters refer to similar parts throughout the several views of the drawings.

DESCRIPTION OF THE INVENTION

Figure 1:
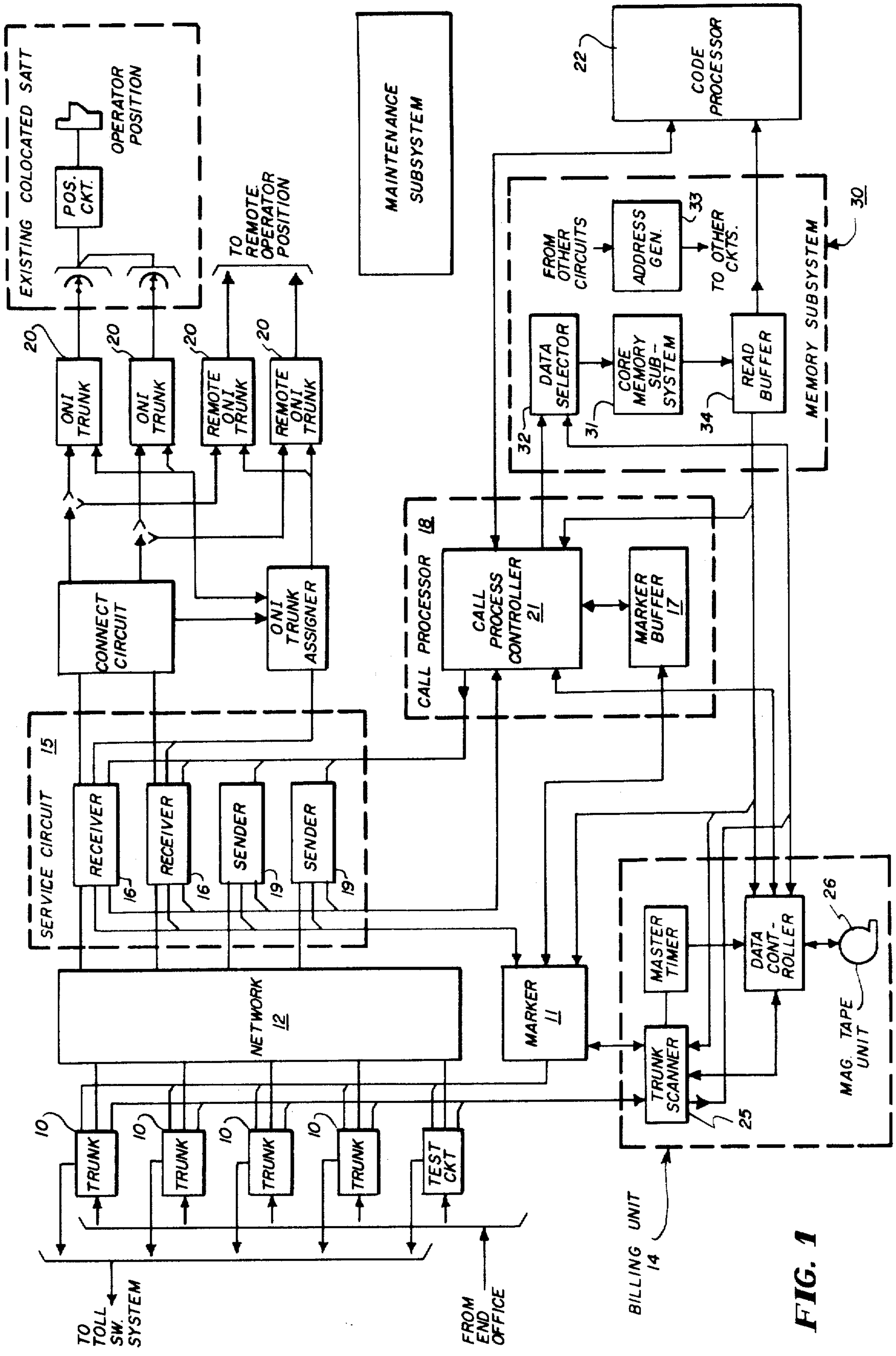
FIG. 1 is a functional block diagram of the centralized automatic message accounting system.

Referring now to the drawings, in FIG. 1 the centralized automatic message accounting system is illustrated in blcok diagram, and the functions of the principal equipment elements can be generally described as follows. The trunks 10, which may be either multifrequency (MF) trunks or dial pulse (DP) trunks, provide an interface between the originating office, the toll switching system, the marker 11, the switching ntework 12, and the billing unit 14. The switching network 12 consists of three stages of matrix switching equipment between its inlets and outlets. A suitable distribution of links between matrices are provided to insure that every inlet has full access to every outlet for any given size of the switching network. The three stages, which consist of A, B and C crosspoint matrices, are interconnected by AB and BC links. The network provides a minimum of 80 inlets, up to a maximum of 2,000 inlets and 80 outlets. Each inlet extends into an A matrix and is defined by an inlet address. Each outlet extends from a C matrix to a terminal and is defined by an outlet address.

Each full size network is divided into a maximum of 25 trunk grids on the inlet side of the network and a service grid with a maximum of 16 arrays on the outlet side of the network. The trunk grids and service grid within the networks are interconnected by the BC link sets of 16 links per set. Each MF trunk grid is provided for 80 inlets. Each DP trunk grid is provided for 40 inlets. The service grid is provided for a maximum of 80 outlets. A BC link is defined as the interconnection of an outlet of a B matrix in the trunk grid and an inlet of a C matrix in the service grid.

The marker 11 is the electronic control for establishing paths through the electromechanical network. The marker constantly scans the trunks for a call for service. When the marker 11 identifies a trunk with a call for service, it determines the trunk type, and establishes a physical connection between the trunk and a proper receiver 16 in the service circuits 15.

The trunk identity and type, along with the receiver identity, are temporarily stored in a marker buffer 17 in the call processor 18 which interfaces the marker 11 and the call processor 18.

When the call processor 18 has stored all of the information transmitted from a receiver, it signals the marker 11 that a particular trunk requires a sender 19. The marker identifies an available sender, establishes a physical connection from the trunk to the sender, and informs the call processor 18 of the trunk and sender identities.

The functions of the receivers 16 are to receive MF 2/6 tones or DP signals representing the called number, and to convert them to an electronic 2/5 output and present them to the call processor 18. A calling number is received by MF 2/6 tones only. The receivers will also accept commands from the call processor 18, and interface with the ONI trunks 20.

The function of the MF senders are to accept commands from the call processor 18, convert them to MF 2/6 tones and send them to the toll switch.

The call processor 18 provides call processing control and, in addition, provides temporary storage of the called and calling telephone numbers, the identity of the trunk which is being used to handle the call, and other necessary information. This information forms part of the initial entry for billing purposes in a multi-entry system. Once this information is passed to the billing unit 14, where a complete initial entry is formulated, the call will be forwarded to the toll switch for routing.

The call processor 18 consists of the marker buffer 17 and a call processor cntroller 21. There are 77 call stores in the call processor 18, each call store handling one call at a time. The call processor 18 operates on the 77 call stores on a time-shared basis. Each call store has a unique time slot, and the access time for all 77 call stores is equal to 39.4 MS, plus or minus 1%.

The marker buffer 17 is the electronic interface between the marker 11 and the call processor controller 21. Its primary functions are to receive from the marker 11 the identities of the trunk, receiver or sender, and the trunk type. This information is forwarded to the appropriate call store.

The operation of the call process controller revolves around the call store. The call store is a section of memory allocated for the processing of a call, and the call process controller 21 operates on the 77 call stores sequentially. Each call tore has 8 rows and each row consists of 50 bits of information. The first and second rows are repeated in rows 7 and 8, respectively. Each row consists of 2 physical memory words of 26 bits per word. 25 bits of each word are used for storage of data, and the 26th bit is a parity bit.

The call processor controller 21 makes use of the information stored in the call store to control the progress of the call. It performs digit accumulation and the sequencing of digits to be sent. It performs fourth digit 0/1 blocking on a 6 or 10 digit call. It interfaces with the receivers 16, the senders 19, the code processor 22, the billing unit 14, and the marker buffer 17 to control the call.

The main purpose of the code processor 22 is to analyze call destination codes in order to perform screening, prefixing and code conversion operations of a nature which ar originating point dependent. This code processing is peculiar to the needs of direct distance dialing (DDD) originating traffic and is not concerned with trunk selection and alternate routing, which are regular translation functions of the associated toll switching machine. The code processor 22 is accessed only by the call processor 18 on a demand basis.

The billing unit 14 receives and organizes the call billing data, and transcribes it onto magnetic tape. A multi-entry tape format is used, and data is entered into tape via a tape transport operating in a continuous recording mode. After the calling and called director numbers, trunk identity, and class of service information is checked and placed in storage, the billing unit 14 is accessed by the call process controller 21. At this time, the call record information is transmitted into the billing unit 14 where it is formated and subsequently recorded on magnetic tape. The initial entry will include the time. Additional entries to the billing unit 14 contain answer and disconnect information.

The trunk scanner 25 is the means of conveying the various states of the trunks to the billing unit 14. The trunk scanner 25 is connected to the trunks by a highway extending from the billing unit 14 to each trunk. Potentials on the highway leads will indicate states in the trunks.

Each distinct entry (initial, answer, disconnect) will contain a unique entry identity code as an aid to the electronic data processing (EDP) equipment in consolidating the multi-entry call records into toll billing statements. The billing unit 14 will provide the correct entry identifier code. The magnetic tape unit 26 is comprised of the magnetic tape transport and the drive, storage and control electronics required to read and write data from and to the 9 channel billing tape. The read function will allow the tape unit to be used to update the memory.

The recorder operates in the continuous mode at a speed of 5 inches per second, and a packing density of 800 bits per inch. Billing data is recorded in a multi-entry format using a 9 bit EBCDIC character (extended binary coded decimal interchange code). The memory subsystem 30 serves as the temporary storage of the call record, as the permanent storage of the code tables for the code processor 18, and as the alterable storage of the trunk status used by the trunk scanner 25.

The core memory 31 is composed of ferrite cores as the storage elements, and electronic circuits are used to energize and determine the status of the cores. The core memory 31 is of the random access, destructive readout type, 26 bits per word with 16 K words.

For storage, data is presented to the core memory data registers by the data selector 32. The address generator 33 provides the address or core storage locations which activate the proper read/write circuits representing one word. The proper clear/write command allows the data selected by the data selector 32 to be transferred to the core storage registers for storage into the addressed core location.

For readout, the address generator 33 provides the address or core storage location of the word which is to be read out of memory. The proper read/restore command allows the data contained in the word being read out, to be presented to the read buffer 34. With a read/restore command, the data being read out is also returned to core memory for storage at its previous location.

The method of operation of a typical call in the system, assuming the incoming call is via an MF trunk can be described as follows. When a trunk circuit 10 recognizes the seizure from the originating office, it will provide an off-hook to the originating office and initiate a call-for-service to the marker 11. The marker 11 will check the equipment group and position scanners to identify the trunk that is requesting service. Identification will result in an assignment of a unique 4 digit 2/5 coded equipment identity number. Through a trunk-type determination, the marker 11 determines the type of receiver 16 required and a receiver/sender scanner hunts for an idle receiver 16. Having uniquely identified the trunk and receiver, the marker 11 makes the connection through the three-stage matrix switching network 12 and requests the marker buffer 17 for service.

The call-for-service by the marker 11 is recognized by the marker buffer 17 and the equipment and receiver identities are loaded into a receiver register of the marker buffer 17. The marker buffer 17 now scans the memory for an idle call store to be allocated for processing the call, under control of the call process controller 21. Detection of an idle call store will cause the equipment and receiver identities to be dumped into the call store. At this time, the call process controller 21 will instruct the receiver 16 to remove delay dial and the system is now ready to receive digits.

Upon receipt of a digit, the receiver 16 decodes that digit into 2/5 code and times the duration of digit presentation by the calling end. Once it is ascertained that the digit is valid, it is presented to the call processor 18 for a duration of no less than 50 milliseconds of digit and 50 milliseconds of interdigital pause for storage in the called store. After receipt of "ST," the call processor controller 21 will command the receiver 16 to instruct the trunk circuit 10 to return an off-hook to the calling office, and it will request the code processor 18.

The code processor 18 utilizes the called number to check for EAS blocking and other functions. Upon completion of the analysis, the code processor 18 will send to the call processor controller 21 information to route the call to an announcement or tone trunk, at up to 4 prefix digits if required, or provide delete information pertinent to the called number. If the call processor controller 21 determined that the call is an ANI call, it will receive, accumulate and store the calling number in the same manner as was done with the called number. After the call process controller 21 receives "ST," it will request the billing unit 14 for storage of an initial entry in the billing unit memory. It will also command the receiver 16 to drop the trunk to receiver connection. The call processor controller 21 now initiates a request to the marker 11 via the marker buffer 17 for a trunk to sender connection. Once the marker 11 has made the connection and has transferred the identities to the marker buffer 17, the marker buffer will dump this information into the appropriate call store. The call processor controller 21 now interrogates the sender 19 for information that delayed dial has been removed by the routing switch (crosspoint tandem or similar). Upon receipt of this information the call processor controller 21 will initiate teh sending of digits including "KP" and "ST." The call process controller 21 will control the duration of tones an interdigital pause. After sending the "ST," the call processor 18 will await the receipt of the matrix release signal from the sender 19. Receipt of this signal will indicate that the call has been dropped. At this time, the sender and call store are returned to idle, ready to process a new call.

The initial entry information when dumped from the call store is organized into the proper format and stored in the billing unit memory. Eventually, the call answer and disconnect entries will also be stored in the billing unit memory. The initial entry will consist of approximately 40 characters and trunk scanner 25 entries for answer or disconnect contain approximately 20 characters. These entries will be temporarily stored in the billing unit memory until a sufficient number have been accumulated to comprise one data block of 1370 characters. Once the billing unit memory is filled, the magnetic tape unit 26 is called and the contents of the billing unit memory is recorded onto the magnetic tape.

The final result of actions taken by the system on a valid call will be a permanent record of billing information stored on magnetic tape in multi-entry format consisting of initial, answer, and disconnect or forced disconnect entries.

Answer timing, force disconnect timing and other timing functions such as, for example, a "grace period" timing interval on answer, in the present system, are provdied by the trunk timers. These trunk timers are memory timers, and an individual timer is provided for each trunk in a trunk scanner memory which, as can be best seen in FIG. 2, which illustrates the memory layout, comprises a status section and a test section.

The status section contains 1 word per ticketed trunk. Each word contains status, instruction, timing and sequence information. The status section also provides 1 word per trunk group which contains the equipment group number, and an equipment position tens word that identifies the frame. A fully equipped status section requires 2,761 words of memory representing 2,000 trunks spread over 60 groups plus a status section "start" word. As each status word is read from memory, it is stored in a trunk scanner read buffer (not shown). The instruction is read by a scanner control to identify the contents of the word. The scanner control logic acts upon the timing, seuquence and status information, and returns the updated word to the trunk scanner memory and it is written into it for use during the next scanner cycle.

The test section contains a maximum of 83 words: a start word, a last programmed word, 18 delay words, 2 driver test words, 1 end-test word and 1 word for each equipment group. The "start test" word causes a scan point test to begin. The delay words allow time for scan point filters. to charge before the trunk groups are scanned, with the delay words containing only instructional data. The equipment group words contain a 2 digit equipment group identity and 5 trunk frame equipped bits. The trunk frame equipped bits (1 per frame) indicates whether or not a frame exists in the position identified by its assigned bit. The delay words following the equipment group allow the scan point filters to recharge before the status section of memory is accessed again for normal scanning. The Last Program word inhibits read and write in the trunk scanner memory until a trunk scanner address generator has advanced through enough addresses to equal the scanner cycle time. When the cycle time expires, the trunk scanner address generator returns to the start of the status section of memory and normal scanning recommences.

The trunk scanner memory and the trunk scanner read buffer are not part of the trunk scanner 25, however, the operation thereof is controlled by a scanner control which forms a part of the trunk scanner 25 of the billing unit 14. The trunk scanner 25 maintains an updated record of the status of each ticketed trunk, determines from this status when a billing entry is required, and specifies the type of entry to be recorded. The entry includes the time it was initiated and the identification of its associated trunk.

Scanning is performed sequentially, by organizing the memory in such a manner that when each word is addressed, the trunk assigned to that address is scanned. This causes scanning to progress in step with the trunk scanner address generator. During the address advance interval, the next scanner word is addressed and, during the read interval, the word is read from memory and stored in the trunk scanner read buffer. At this point, the trunk scanner 25 determines the operations to be performed by analyzing the word instruction.

Figure 3:
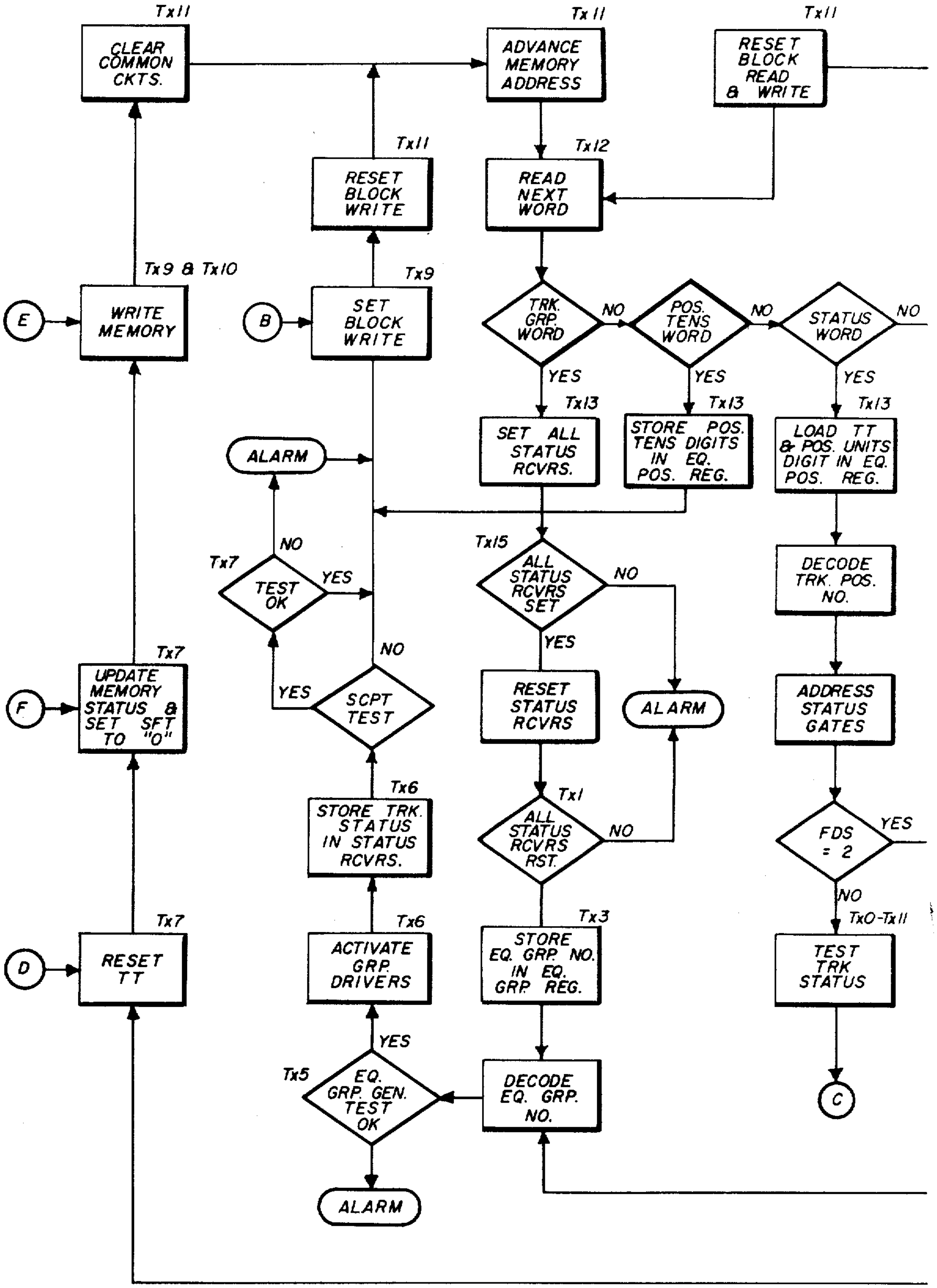
Figure 4:
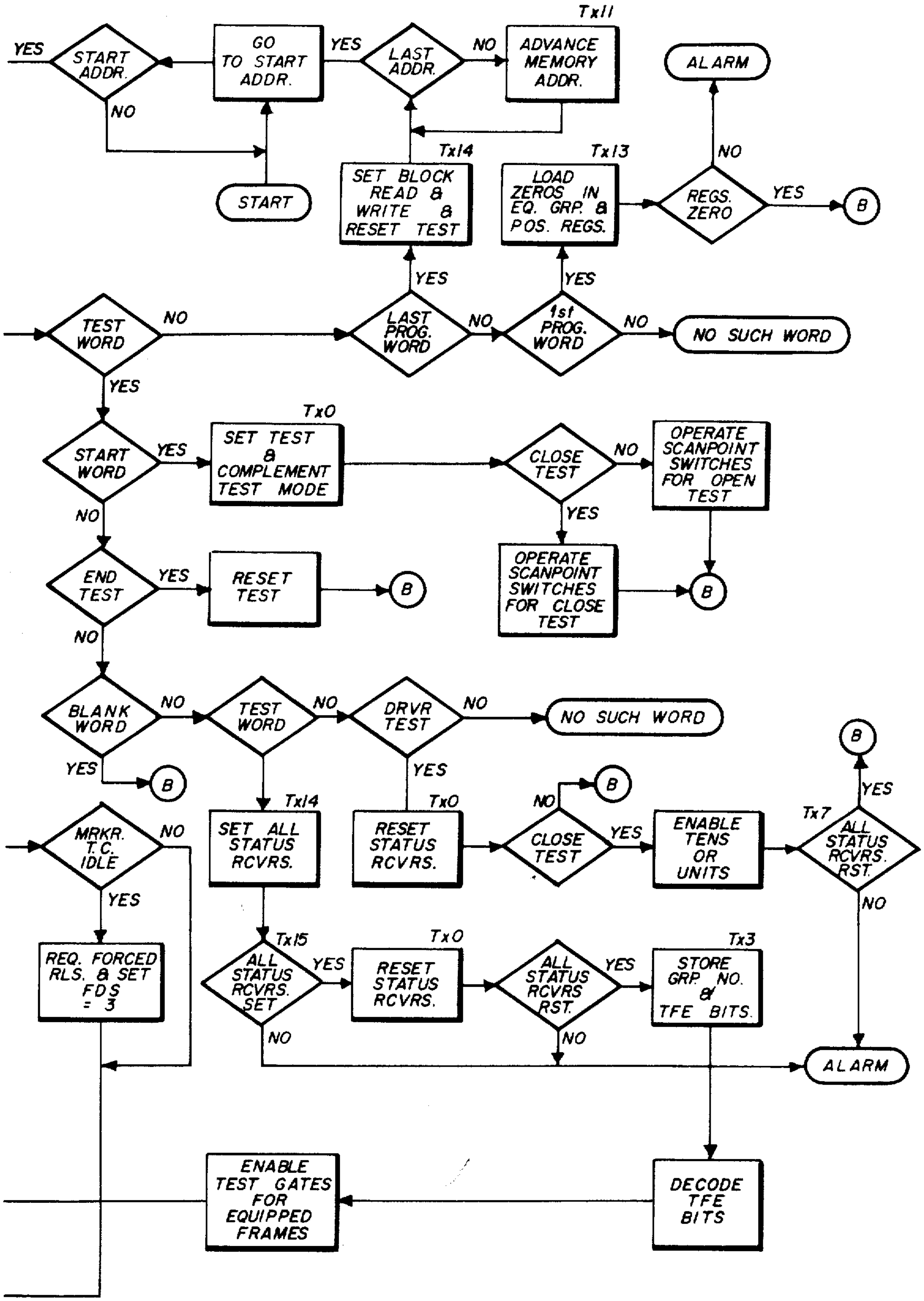
FIGS. 4–6 are a flow chart of the trunk scanner operations.
Figure 5:
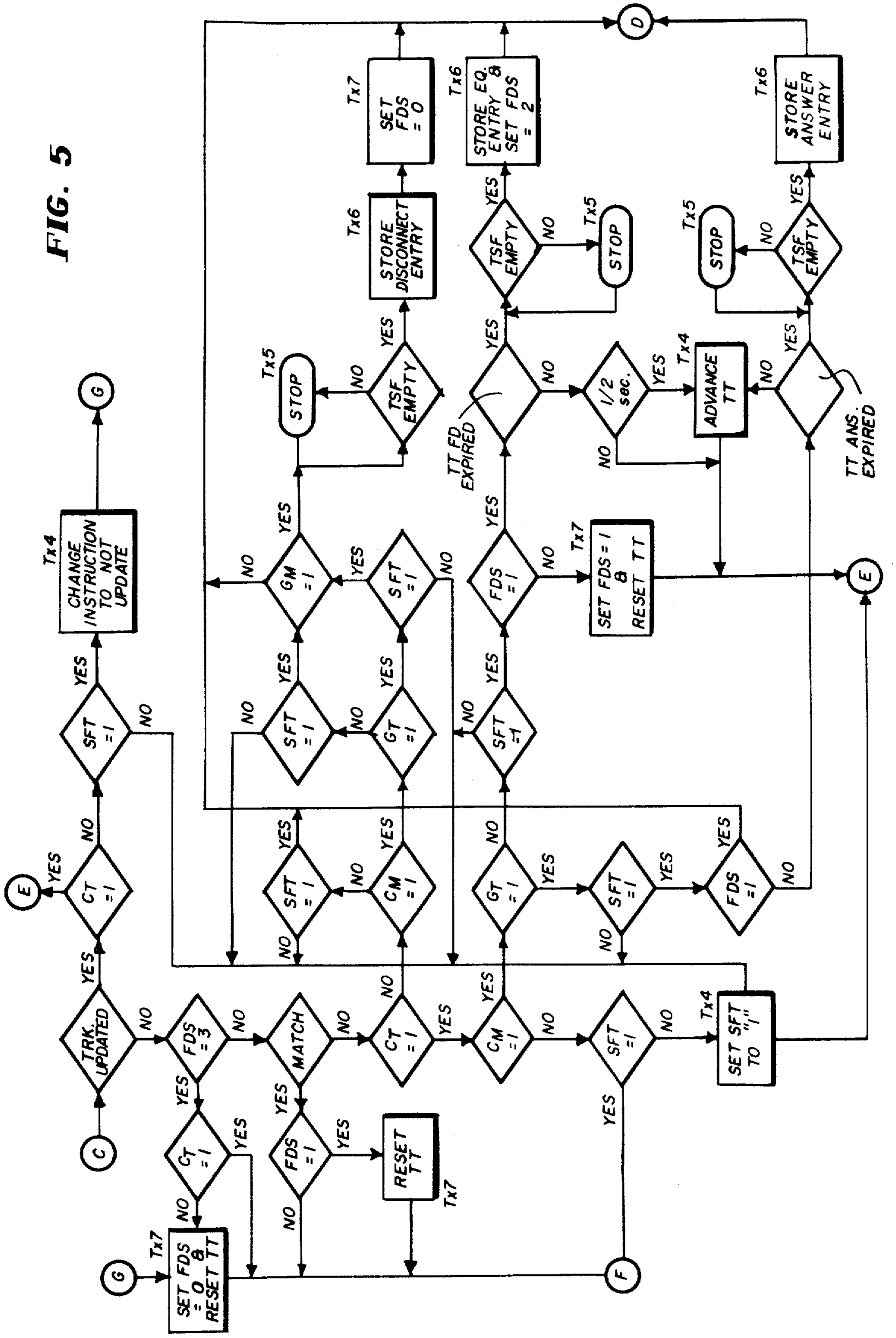

Referring now to FIGS. 3, 4 and 5, which are flow charts of the trunk scanner operations, the operation of the latter as well as the trunk timer can be described.

As indicated above, scanning is performed sequentially. If all trunks in all groups are scanned in numerical sequence beginning with trunk 0000, scanning would proceed in the following manner:

Step 1. Trunk 0000 located in frame 00 (lineup 0, column 0) in the top file, leftmost card position would be scanned first.

Step 2. All trunks located in frame 00 and the leftmost card position would be scanned next from the top file to the bottom.

Step 3. Scanning advances to frame 01 (lineup 0, column 1) and proceeds as in Step 2.

Step 4. Scanning proceeds as in Step 3 until frame 04 has been scanned.

Step 5. The scanner returns to frame 00 and Step 2 is repeated for the next to leftmost card position.

Step 6. The sequence just described continues until all ten card positions in all 5 columns have been examined.

Step 7. The entire process is repeated in lineups 1 through 5.

When a memory word instruction identifies a trunk group word, the status receivers are cleared to prepare for scanning the trunks specified in the group word. The trunk group digits stored in the trunk scanner read buffer (TSRB) are transferred into the equipment group register.

After the trunk group number is decoded, it is transformed into binary code decimals (BCD), processes through a 1-out-of-N check circuit, and applied to the AC bus drivers (ACBD). The drivers activate the scan point circuits via the group leads and the trunk status is returned to the receivers.

A group address applied to the drivers causes the status of all trunks in 1 lineup and 1 card position and all columns to be returned to the receivers. The group tens digit specifies the trunk frame lineup and the group units digit identifies the card slot.

When a status word is read from memory, it sets the previous count of a trunk timer (TT) into the trunk timer.

If the trunk is equipped and the forced disconnect sequence equals 2 (FDS=2), a request to force release the trunk is transmitted to the marker 11. If FDS does not equal 2, the present condition of the ticketing contacts in the trunk is tested. If the instruction indicates that the trunk is in an updated condition (the trunks associated memory word was reprogrammed) it is tested for idle. If the trunk is idle, its instruction is changed to denote that it is ready for new calls. If the trunk is not idle, no action is taken and the trunk scanner 25 proceeds to the next trunk.

If the trunk is not in the updated condition and FDS=3, the trunk is tested for idle. If the trunk is idle, FDS is set to 0 and TT is reset.

If FDS does not equal 3 and a match exists between the present contact status and the previous contact status stored in memory (bits 5 and 6) the FDS memory bits are inspected for a count equal to 1. If FDS=1, TT is reset and the memory contact status is updated. If FDS does not equal 1, TT is not reset.

During any analysis of a trunk status, a change in the contact configuration of a trunk is not considered valid until it has been examined twice.

1 bit (SFT) is provided in each memory status word to indicate whether or not a change in status of the trunk was detected during the previous scan cycle.

When a change in status is detected, SFT is set to 1. If SFT=1 on the next cycle, the status is analyzed and SFT is set to 0.

If a mismatch exists between the present contact condition and that previously stored in memory, the status has changed and a detailed examination of the status is started.

If CT=1, the truunk is busy and so the previous condition of the contact is inspected. If the trunk previously was idle, CM=0. Before continuing the analysis, it must be determined if this is the first indication of change in the trunk status by examining the "second look" bit (SFT). If SFT=0, it is set to equal 1, and the analysis of this trunk status is discontinued until the next scanner cycle. If SFT=1, the memory status is updated and SFT is set to equal 0.

If CT=1, the trunk is cut through and CM is inspected to determine if the memory status was updated. If CM=1, the CT contact status must differ from GM since it was already determined that a mismatch exists. If GT=0, answer has not occurred. If GT=1, and this condition existed during the previous scan cycle, SFT=1 also. If these conditions are true and FDS does not equal 1, TT is advanced and answer timing begins. If these conditions persist for 8 scanner cycles (approximately 1 second), answer is confirmed and an entry will be stored in the trunk scanner formater (TSF). If answer is aborted (possibley hookswitch fumble) before the 1 second answer time (time is adjustable) expires, TT remains at its last count. When the answer condition returns, answer timing continues from the last TT count. Thus, answer timing is cumulative.

After an answer entry is stored, which includes the TT count, TT is reset, SFT is set to 0, and the new contact status is written into memory.

If a mismatch exists and CT=0, the previous state of this contact is inspected by examining bit 5 in the trunk scanner read buffer (TSRB). If CM=1, the state of the terminating end of the trunk is tested. If GT=1, then the condition of the trunk has just changed from answer to disconnect. If this condition existed during the previous scan cycle, SFT=1 and a disconnect entry is stored in the TSF.

After the disconnect entry is stored, which includes the TT count, TT is reset, FDS and SFT are set to 0, and the new status is written into memory.

If a mismatch exists and the originating end of a trunk is not released, both CT and CM equals 1. If GT=0 after the previous scan cycle, FDS is tested. If this change just occurred, FDS does not equal 1. Since FDS does not equal 1, it will be set equal to 1 and TT will reset. FDS=1 indicates that forced disconnect timing is in progress.

While the conditions just described exist, i.e., mismatch, CT=1, CM=1, GT=0 and FDS=1, TT will advance 1 count during each scanner cycle, if one half second has elasped since the last scan cycle. TT will continue to advance until it reaches a count of 20 (approximately 10 seconds) when a forced disconnect entry will be stored in the TSF.

When the entry is stored, FDS is set at 2 indicating that the trunk is to be force released. After the entry is stored, which includes the TT count, TT is reset, SFT is set to 0, and the new status is written into memory.

After the status and test sections of the memory have been accessed, the Last Program word is read from memory and stored in the trunk scanner read buffer. This word causes read/write in the trunk scanner portion of memory to be inhibited and deactivates the scan point test. The trunk scanner address generator will continue to advance, however, until sufficient words have been addressed to account for one scan cycle. When a predetermined address, the Last Address, is reached, block read/write is removed and the address generator returns to the Start Address (First Program Word) of the scanner memory.

From the above description, it can be seen that the trunk timer TT is used for timing both the answer timing and the forced disconnect timing. Furthermore, in the case of the latter, the counting rate is different, with the counting rate being derived from a mastertimer rather than from the memory timer. The manner in which these different counting rates are derived can be seen by reference to FIGS. 2 and 3–5.

As indicated above, each trunk has its own individual trunk timer TT and its assigned memory status word, in memory bits 11 through 15. The memory bits 11, 12 and 13 (TTU) provide a maximum count of 8 and the memory bits 14 and 15 (TTT) count groups of 8 up to a maximum of 4 counts of 8. The trunk timer TT therefore counts in octal up to 32.

When a status word is read from memory, identified by instructions 13 or 17, the TT count in the memory bits 11 through 15 is set into an electronic counter 46 where the count can be advanced if required. During answer timing, TT is advanced once each scanner cycle, under control of the status analyzer and timing circuit (SACT), as can be seen in the flow chart of the trunk scanner operation in FIGS. 3, 4 and 5. Under these conditions, the counting rate of the trunk timer TT is approximately 150 to 200 milliseconds.

A preselected "grace period" is provided by means of a strapping field and, as fully described above, when this "grace period" expires, answer is confirmed and an answer entry is recorded for that call.

If the called party "hangs up" during the "grace period," the trunk timer TT remains at its last count until the calling party terminates the call or the called party reanswers. If the calling party releases, the trunk timer TT is reset and the call is terminated. If the called party reanswers, the trunk timer TT continues to advance from its last count until the "grace period" expires.

During forced disconnect timing, the memory bits 11 through 15 of the trunk timer TT are used for timing, but the counting rate is different. As indicated above, FDS=1 indicates that forced disconnect timing is in progress and the trunk timer TT starts timing.

In this case, the base counting rate is derived from the system's master timer which is an electrically operated and controlled clock pulse generator. The arrangement is such that whenever ½ second elapses in the master timer, the advance ready latch circuit AR is set. If the latch circuit AR is set when the Start Address in the scanner memory is reached, the gate 48 is enabled and the 1 cycle latch circuit OC is set. When the latch circuit OC sets, the latch circuit AR resets.

During the next immediate scan cycle, all status words having FDS=1, the called party "on hook" and the calling party "off hook," i.e., mismatch, CT=1, CM=1, GT=0 and FDS=1, will have their trunk timers TT advanced by one count. When the scanner memory reaches its Last Address, the latch circuit OC is reset, and counting ceases until the next ½ second elapses in the master timer. This process is repeated until the preselected "forced disconnect" interval (when TT count equals 10 or approximately 10 seconds in the illustrated embodiment) expires, causing FDS to advance to 2 and a disconnect entry to be recorded. When FDS=2, the trunk being held is "force released" and FDS is set to 3.

A further feature provided by the above-described timing arrangement is that the "exact time" that the call is first answered, or terminated, can be easily determined. For example, should the called party drop the handset when answering the telephone, as during hookswitch fumble, answer timing is suspended until the answer condition returns or until the calling party disconnects. If the called party lifts the handset again before the calling party disconnects, answer timing continues until the preselected "grace period" expires. When the "grace period" expires, an answer entry is recorded that contains the real time that the answer entry was initiated. Time accumulated in memory bits 11 through 15 of the trunk timer TT can be subtracted from the real time recorded in the disconnect entry, the "exact time" will still be obtained which, of course, is the time recorded in the disconnect entry.

If the called party disconnects first, time is accumulated in the memory bits 11 through 15 of the trunk timer TT, until the time allowance for disconnect expires, or the calling party subsequently disconnects. When the time expires, or the calling party disconnects, a disconnect entry is recorded. When the time expires, the calling end of the trunk is forcibly released, as described above. The time accumulated in the trunk timer TT memory bits 11 through 15 is subtracted from the real time recorded in the disconnect entry, to obtain the "exact time" of disconnect.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by letters Patent is:

1. A method of using a single memory timer and providing at least a first and a second counting rate in a system in accordance with the existence of a first and a second system condition, respectively, comprising the steps of: reading out of a memory the memory bits forming said memory timer; coupling said memory bits into counter means; advancing by one the count registered by said counter means when said first system condition exists, or providing a delay time of a predetermined time interval and then advancing by one the count registered by said counter means when said second system condition exists; and writing said advanced count back into the memory.

2. The method of claim 1, wherein said system includes a master timer and a system status analyzer for determining the system condition, said status analyzer being operative to advance by one the count registered by said counter means when said first system condition exists, said advanced count being written into said memory during the same scanning cycle to thereby provide a first counting rate which corresponds to the scanning cycle time of said memory.

3. The method of claim 2, wherein said master timer when said second system condition exists being operative upon the expiration of a predetermined time interval to enable said status analyzer to advance by one the count registered by said counter means, said master timer thereby providing a delay time of a predetermined time interval before advancing by one the count registered by said counter means, said advance count being written into said memory during the same scanning cycle to thereby provide a second counting rate.

4. The method of claim 1, wherein said memory bits are read out of the memory into said counter means and the count registered by said counter means advanced by one and then written back into the memory during each scanning cycle when said first system condition exists, to thereby provide a counting rate corresponding to the scanning cycle time of said memory.

5. The method of claim 1, wherein said system includes a system status analyzer for controlling the operation of said counter means to advance the count registered therein, a master timer, means responsive to said master timer when said second system condition exists to cause said system analyzer to advance the count registered by said counter means, said master timer upon the expiration of a predetermined time interval operating said means responsive to it whereby said system analyzer when said second system condition exists causing the count registered by said counter means to be advanced by one, said advanced count being written back into said memory.

6. A timing arrangement for providing at least a first and a second counting rate in a system in accordance with the existance of a first and a second system condition, said system comprising a memory having a plurality of memory bits forming a memory timer, counter means, said memory bits being read out of said memory and coupled into said counter means, means for advancing by one the count registered in said counter means, said means being responsive to the existence of said first system condition to advance by one the count registered by said counter means, said advance count being written into said memory during the same scanning cycle during which said memory bits are read out of said memory to thereby provide a counting rate corresponding to the scanning cycle time of said memory, said system further including a master timer, means responsive to said master timer when said second system condition exists for controlling the operation of said means for advancing the count registered by said counter means to advance the count registered therein, said master timer upon the expiration of a predetermined time inverval and the existence of said second system condition operating said means responsive to said master timer to cause the counter registered by said counter means to be advanced by one, said advanced count then being written into said memory.

7. The time arrangement of claim 6, wherein said memory further includes a start address and a last address which are read from said memory during a scanning cycle and said system further includes a first and a second latching circuit means, means operated by said master timer upon the expiration of a predetermined time interval and the existence of said second system condition to set said first latch means, gate means enabled upon the coincidence of said first latch means being set and said start address being read from said memory to set said second latch means, said second latch means upon being set causing said means for advancing by one the count registered by said counter means to advance the count thereof, said advanced count being written into said memory, whereby the count of said memory timer is advanced at a second counting rate when said second system exists.

* * * * *

UNITED STATES PATENT OFFICE

CERTIFICATE OF CORRECTION

Patent No. 3,774,175 Dated November 20, 1973

Inventor(s) Richard A. Padgett

It is certified that error appears in the above-identified patent and that said Letters Patent are hereby corrected as shown below:

On the covering page, change "7 Drawing Figures" to read -- 6 Drawing Figures --

Figure 2:
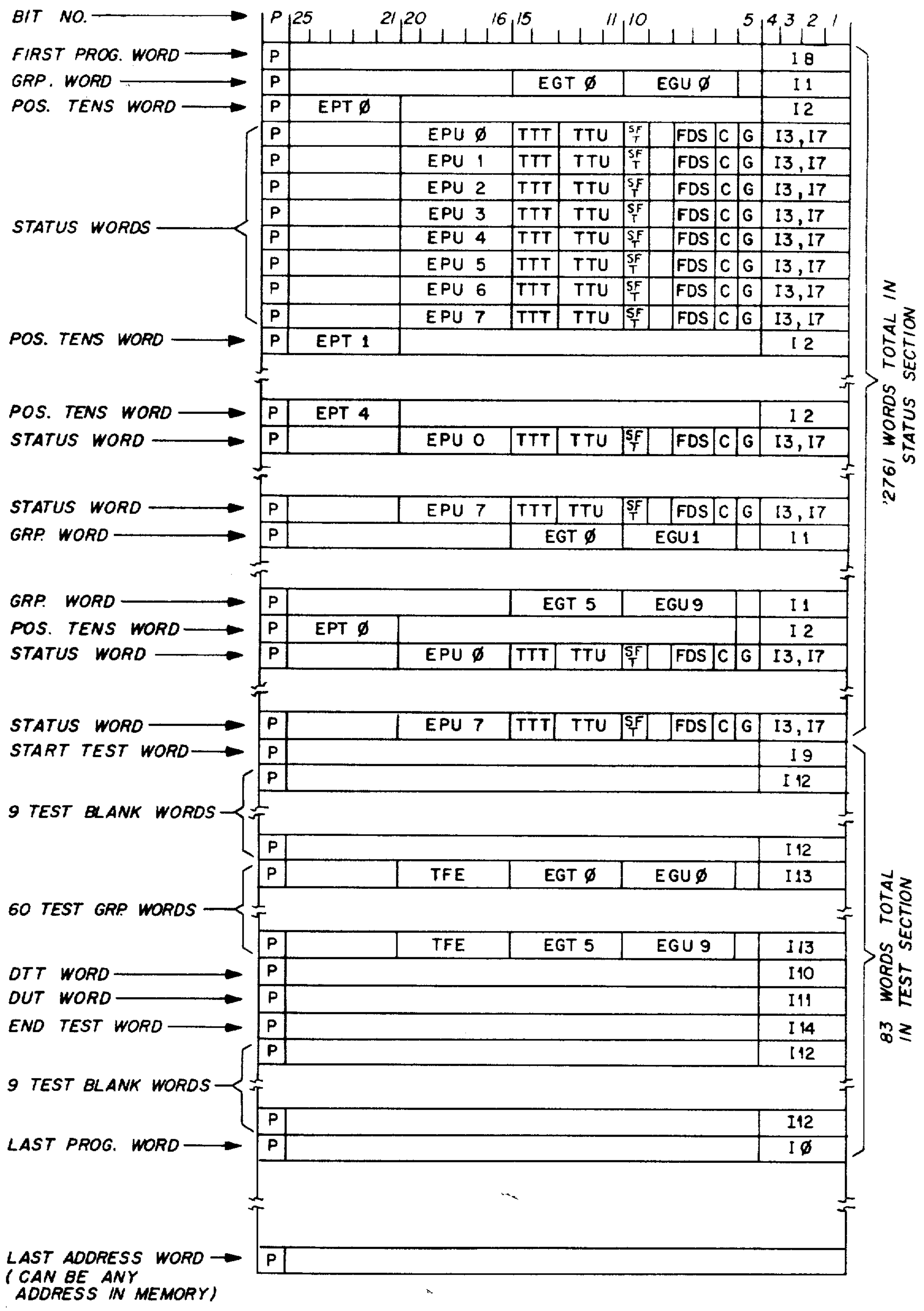
FIGS. 2 and 3 illustrate the trunk scanner memory layout for the status section and the test section, respectively.
Figure 6:
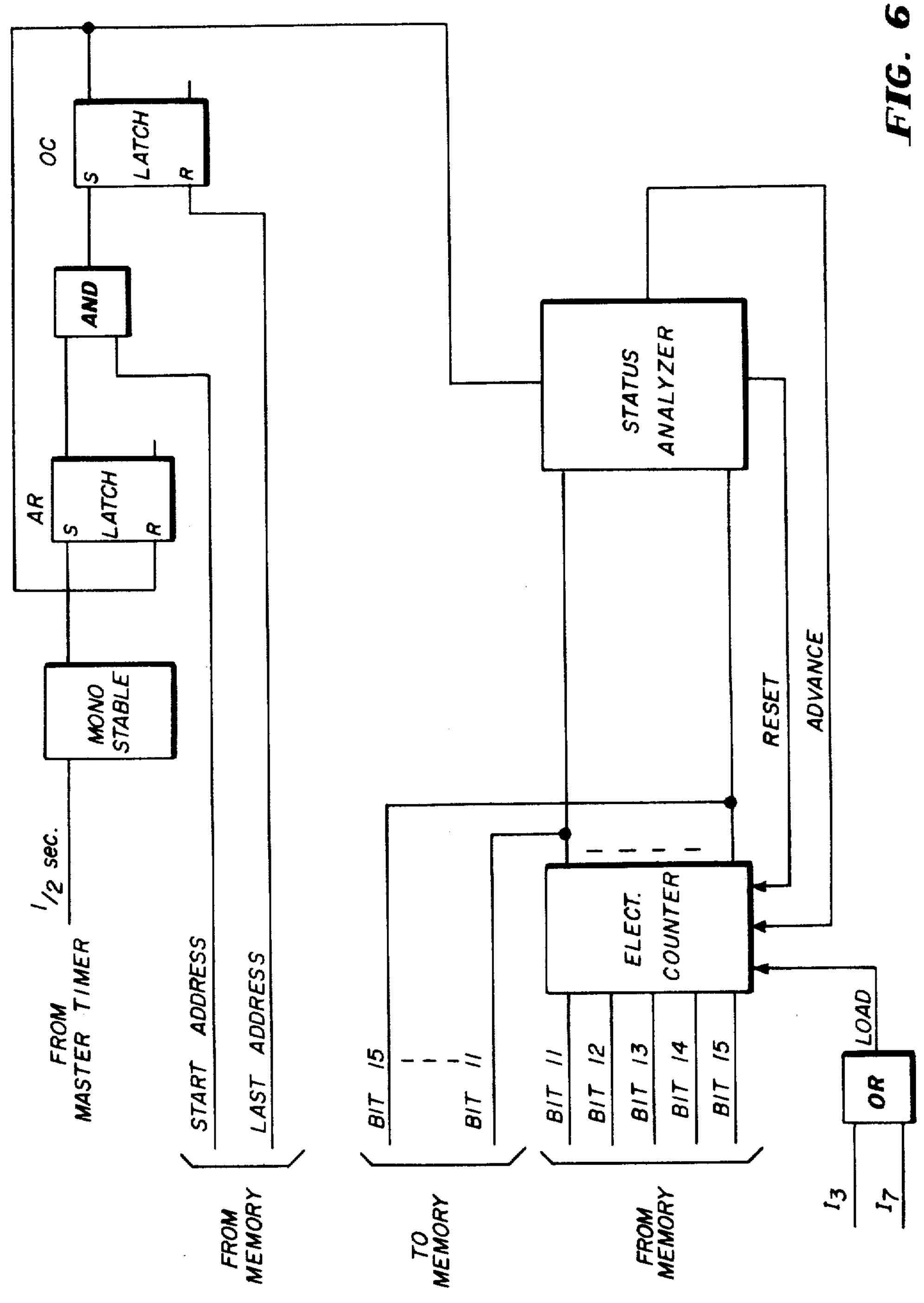

Column 1, lines 59-61, change FIGS. 2 and 3 illustrate the trunk scanner memory layout for the status section and the test section, respectively" to read -- FIG. 2 illustrates the trunk scanner memory layout for the status section and the test section;

line 62, change "FIGS. 4-6 to read -- FIGS. 3-5 -- line 64, change "FIG. 7" to read -- FIG. 6 --

Column 12, line 13, "inverval" should read -- interval --

Signed and sealed this 14th day of May 1974.

(SEAL)
Attest:

EDWARD M.FLETCHER,JR.
Attesting Officer

C. MARSHALL DANN
Commissioner of Patents